:::::::::::::::::::::::::::::::::::::::::::::::::::::
2,953,478
GLASS FIBERS COATED WITH ACETONE-FORMALDEHYDE REACTION PRODUCTS

Mortimer T. Harvey, South Orange, and Peter L. Rosamilia, Newark, N.J., assignors to Harvel Research Corporation, a corporation of New Jersey No Drawing. Filed Oct. 1, 1956, Ser. No. 612,932

7 Claims. (Cl. 117—126)

This invention relates to novel products and to methods for making them. In one of its more specific aspects the invention is directed to glass fibers, threads, yarns, as well as matted and woven glass modified by certain organic compositions.

We have discovered that a variety of organic compositions (I) may be employed as lubricants, sizings, coating and binders for glass fibers, threads, yarns and matted and woven glass fibers, threads and yarns. Such organic compositions are selected from the group consisting of (A) resinous acetone-formaldehyde reaction Products, (B) resinous reaction Products produced by reacting a combination of acetone and another ketone having three hydrogen atoms of an alpha carbon with formaldehyde, (C) resinous reaction Products of (A) and (B) respectively reacted with urea or melamine or mixtures of urea and melamine or first with urea and then with melamine, or first with melamine and then with urea, (D) the respective reaction Products (A), (B) and (C) in combination with starch and/or dextrin and (E) the respective resinous reaction Products (A) and (B) in combination with starch and/or dextrin and urea and/or melamine. Said resinous reaction Products (A), (B) and (C) are characterized as follows: all of them are normally liquid, water soluble and are capable of being converted to the solid state when an 80 gram sample thereof in 20 grams of water is mixed with 10 grams of lime and such mixture is maintained at 250° F. for 24 hours.

The following are examples given merely by way of illustration and not limitation of some of the organic compositions (I) which may be employed in the practice of the present invention, all parts being given by weight unless otherwise specified.

GENERAL EXAMPLE A

Resinous reaction Products (A) may be produced by reacting 1 mole of acetone with 2–5 moles of formaldehyde in the presence of an alkaline agent, such as sodium hydroxide, potassium hydroxide, etc.

Example 1A (1 mole acetone—4 moles formaldehyde)

300 lbs. of acetone
1700 lbs. of formaldehyde (37% conc.)
25 lbs. of NaOH in
60 lbs. of water The caustic soda-water solution was divided into four equal portions. The unit was loaded with acetone and formaldehyde with the steam on and stirring equipment in operation and the material was heated to 120–125° F. The first portion of caustic soda-water solution was added and the steam cut off. As the temperature rises to 130° F. and the cold water is turned on, an exothermic reaction takes place and the temperature slowly rises to 200° F. then slowly begins to fall. At 185° F. the second portion of caustic soda-water solution is added whereupon the temperature again rises to 200° F. Upon cooling to 185° F. the procedure is repeated allowing the temperature to rise and fall between the additions of caustic soda-water solution and keeping the cold water on the jacket at all times. The mass is then allowed to cool to 145° F. at which time the cold water is shut off. Vacuum is turned on keeping the vent open. The vent is slowly closed and the steam turned on. Dehydration may be continued to produce a resin of 75%–100% concentration. The amount of resin produced measured more than 75% of the combined weights of the acetone and formaldehyde in the original charge. The resin is hereinafter known as Product 1A and is amber colored, is stable for at least 6 months at 30° C., cures in 2 hours at 140° C., cures within 4 hours upon adding 5% lime thereto and cures within 2½ hours upon adding 10% lime thereto. Upon addition of 2%, 5% and 10% lime thereto it will cure in 60, 10 and 3–5 minutes respectively at temperatures of 140° F.

Example 2A (1 mole of acetone—3 moles of formaldehyde)

30 parts of acetone
126 parts of formaldehyde (37% conc.)
2 parts of NaOH in
4 parts of water The caustic soda-water solution was divided into three equal portions. Using the same procedure as that set forth in Example 1A, the resultant resinous product produced, hereinafter known as Product 2A, is amber colored and measures more than 75% of the combined weights of acetone and formaldehyde in the original charge. The resin is soluble in water in up to 200% dilution and insoluble in 600% dilutions in water. 50 parts of this resin mixed with 5 parts of lime was converted to the solid state at room temperature after about ½ hour which on standing becomes hard, firm, infusible and insoluble in acetone, petroleum spirits, aromatic spirits and chlorinated solvents, also unaffected by alkalies and dilute acids.

Example 3A 30 parts of acetone
212 parts of formaldehyde (37% conc.)
4 parts of NaOH in
8 parts of water Employing the same procedure as that set forth in Example 1A, except that after the last addition of caustic soda-water solution and subsequent drop in temperature following the last exothermic reaction, the entire mass is heated and maintained at boiling under a reflux condenser for approximately 15 minutes. The quantity of free formaldehyde in the mass is determined and found to be 5.2% of the amount of formaldehyde in the original charge. Upon dehydration at 210° F. in the manner heretofore indicated, the resultant substantially anhydrous resin, hereinafter known as Product 3A, is an amber colored viscous mass infinitely soluble in water and measuring more than 75% of the combined weight of acetone and formaldehyde in the original charge.

Example 4A 120 lbs. of acetone
340 lbs. of aqueous formaldehyde (37% conc.)
6 lbs. of triethylamine 60 lbs. of acetone, the 340 lbs. of formaldehyde and 3 lbs. of the triethylamine were charged into a reaction vessel equipped with a stirrer and reflux condenser. While being constantly stirred, the mix is heated to about 135° C. whereupon exothermic reaction takes place and the external source of heat is removed. While the mass is constantly stirred, the exothermic reaction is allowed to proceed until a drop in temperature occurs whereupon the remaining 60 lbs. of acetone and 3 lbs. of triethylamine are added to the mass and exothermic reaction again takes place and is again allowed to proceed. When the temperature begins to drop, external heat is again applied to maintain the mass in the state of boiling for ½ hour. The condenser is removed and vacuum is applied to the mass which is dehydrated at elevated temperature to about 80% concentration to provide a solution consisting of 80 parts by weight of acetone-formaldehyde reaction product, hereinafter known as Product 4A, in 20 parts of water.

*Example 5A*

120 lbs. of acetone
340 lbs. of aqueous formaldehyde (37% conc.)
4 lbs. of diethylaminopropylamine 60 lbs. of acetone, the 340 lbs. of aqueous formaldehyde and 2 lbs. of the diethylaminopropylamine were charged into a reaction vessel equipped with stirrer and reflux condenser. While being constantly stirred, the mix is heated to about 135° F. whereupon exothermic reaction takes place. It is allowed to proceed until the temperature of the mass begins to drop whereupon the remaining 60 lbs. of acetone and 2 lbs. of diethylaminopropylamine are added thereto and exothermic reaction again occurs and is allowed to proceed. When the temperature of the mass begins to drop, external heat is applied to maintain the mass in the state of boiling for ½ hour. Then the condenser is removed and vacuum applied and together with external heat, water is removed to provide an 80% aqueous solution consisting of 80 parts of resinous acetone-formaldehyde product, hereinafter known as Product 5A, in 20 parts of water.

*Example 6A*

An 80% aqueous solution of Product 1A is treated to increase the viscosity of said Product 1A and to decrease the free formaldehyde content thereof. For that purpose, said 80% aqueous solution of Product 1A is placed in a reacting vessel and there is added thereto an alkaline agent. When said alkaline agent is added thereto, at room temperature, the pH of the mass at that temperature is initially increased to at least 8. Some of the alkaline agents which may be employed are preferably mild alkaline agents, which ordinarily are added thereto in aqueous solutions and may be sodium sulphite, sodium acetate, potassium sulphite, or equivalent compounds to increase the pH of the mass to at least 8. The temperature of the mass is now slowly heated to a temperature of 220–300° F. The mass is maintained while being constantly stirred within said temperature range, whereupon the resinous mass therein thickens considerably and the pH of an aqueous solution of a sample thereof is less than the original pH. The temperature of said mass is maintained within said temperature range until the viscosity of a solution consisting of four parts of said thickened acetone-formaldehyde resin in one part of water measures 2000–15,000 centipoises at 25° C. and for most commercial purposes 3,000–8,000 centipoises at 25° C. and when sodium sulphite was used as the alkaline agent, the pH of this solution measured between 4.5 and 6.5.

This provides a simple, easily controllable method eminently suitable in factory practice for thickening or increasing the viscosity of the acetone-formaldehyde reaction products to the desired degree and practically eliminates the danger of the resinous product from going over to the infusible state in the reaction vessel. More specifically, for example, 250 lbs. of an aqueous solution consisting of 4 parts of Product 1A in 1 part of water is mixed with an aqueous solution consisting of 5 lbs. of sodium sulphite dissolved in 4 parts of water. The mixture while being constantly stirred, is heated to approximately 250° F. and maintained at that temperature, whereupon it thickens. Samples of the mass as it thickens are taken at intervals and the heat is cut off when a solution consisting of 4 parts of a sample of the thickened mass dissolved in 1 part of water is in the range of 2,000–15,000 cps. at 25° C. The mass is chilled and then enough water is added to the thickened acetone-formaldehyde resin to provide a solution which measures 4 parts of said resin to each part of water present. This batch is an aqueous solution of said resin, hereinafter known as Product 6A, and will have a viscosity within the range hereinbefore set forth.

GENERAL EXAMPLE B

The resins (B) may be produced by reacting formaldehyde with a mixture of acetone and one or a combination of two or more ketones having three hydrogens on an alpha carbon, examples of which are methyl ethyl ketone, mesityl oxide, diacetone alcohol, methyl propyl ketone, all of the following general formula: $CH_3$—$CO$—$R$ in which R is hydrocarbon.

Employing the same procedure as that set forth in Example 1A except that instead of acetone being the only ketone employed, a mixture of acetone and one or more of such other ketones are used, and the components are used in the following proportions:

*Example 1B*

50 parts of acetone
25 parts of methylethyl ketone
425 parts of aqueous formaldehyde (37% conc.)
6 parts NaOH in
12 parts of water providing a solution consisting of 80 parts of resinous reaction product, hereinafter known as Product 1B, in 20 parts of water.

*Example 2B*

37.5 parts of acetone
37.5 parts of methyl ethyl ketone
425 parts of aqueous formaldehyde (37% conc.)
6 parts of NaOH in
12 parts of water to provide a solution consisting of 80 parts of resinous reaction product, hereinafter known as Product 2B, in 20 parts of water.

*Example 3B*

25 parts of acetone
50 parts of methyl ethyl ketone
425 parts of aqueous formaldehyde (37% conc.)
6 parts of NaOH in
12 parts of water to provide a solution consisting of 80 parts of resinous reaction product, hereinafter known as Product 3B, in 20 parts of water.

*Example 4B*

65 parts of acetone
10 parts of methyl ethyl ketone
425 parts of aqueous formaldehyde (37% conc.)
6 parts of NaOH in
12 parts of water to provide a solution consisting of 80 parts of resinous reaction product, hereinafter known as Product 4B, in 20 parts of water.

All of said resinous Products (A) and (B), specific illustrative examples of which are Products 1A–6A and 1B–4B respectively are further characterized as follows: When a 100-gram sample thereof is maintained at 150° C. under subatmospheric pressure of 40 mm. of mercury, a residue remains which is undistillable under said temperature and pressure conditions and measures at least 60% by weight of said sample.

GENERAL EXAMPLE C

Resinous Products (A) and (B) respectively, examples of which are the specific respective Products 1A–6A and 1B–4B, may be reacted with either urea or melamine or first with urea and then with melamine or a combination of urea and melamine together to provide resinous Products (C). For this purpose 80 parts of the Products (A) and (B) respectively, which are in aqueous solution with 20 parts of water, are mixed with 1–20 parts of urea or melamine or 1–20 parts of a combination of urea and melamine in the proportion of 1–10 parts of urea to 10–1 parts of melamine and the mix is preferably heated to 80–110° C. and maintained in that temperature range until solution and reaction takes place after which the mass is quickly chilled to room temperature. Or, 1–10 parts of urea are first added to said solution consisting of 80 parts of respective Products (A) or (B) respectively, in 20 parts of water. The mix is then heated to about 80–110° C. until solution and reaction occur and then 1 to 10 parts of melamine are added to the mass and similarly heated to solution and reaction at 80–110° C., and then the mass is quickly chilled. It is to be understood that when urea is used as reactant, reaction may proceed at room temperature but when melamine is used, temperatures of at least about 80° C. are required.

Example 1C 80 parts of Product 1A in 20 parts of water were mixed with 5 parts of urea and while being constantly stirred, the mass was heated to about 85° C. and held at said temperature until the urea goes into solution and reaction takes place between the urea and Product 1A, whereupon the mass is quickly cooled to room temperature and consists essentially of resin, hereinafter known as Product 1C.

Following the same procedure as that set forth in Example 1C and employing the following components, there are produced the following Products (C):

Examples 2C–11C 80 parts of Products 1A–6A or 1B–4B respectively in 20 parts of water
6 parts of melamine are reacted in the manner set forth above to produce respective Products 2C–11C.

Examples 12C–21C 80 parts of Products 1A–6A, 1B–4B respectively in 20 parts of water
6 parts of a mixture consisting of 2 parts of urea and 4 parts of melamine are reacted in the manner set forth above to produce respective Products 12C–21C.

Examples 22C–31C 80 parts of Products 1A–6A or 1B–4B respectively in 20 parts of water
8 parts of urea are reacted in the manner set forth above to produce respective Products 22C–31C.

Examples 32C–41C 80 parts of Products 1A–6A or 1B–4B respectively in 20 parts of water
10 parts of melamine are reacted in the manner set forth above to produce Products 32C–41C respectively.

Examples 42C–51C 80 parts of Products 1A–6A or 1B–4B respectively in 20 parts of water
12 parts of a mixture consisting of 2 parts of urea and 10 parts of melamine are reacted in the manner set forth above to produce Products 42C–51C respectively.

If desired, respective Products (A) and (B) may first be reacted with urea and then with melamine or first with the melamine and then with urea.

Example 52C 80 parts of Product 1A in 20 parts of water and
2 parts of urea were heated at 50° C. until solution and reaction take place whereupon 6 parts of melamine were added thereto and the temperature was increased to and maintained at 90° C. until solution and reaction occurred. The mass was chilled to room temperature to provide Product 52C.

Examples 53C–61C

Following the same procedure as that set forth in Example 52C, except that instead of Product 1A, 80 parts of Products 2A–6A or 1B–4B respectively were employed, there were provided Products 53C–61C respectively.

Examples 62C–71C 80 parts of Products 1A–6A or 1B–4B respectively in 20 parts of water and
3 parts of melamine are first reacted together at 100° C. and then 6 parts of urea are added and reacted at 60° C. to provide Products 62C–71C respectively.

GENERAL EXAMPLE D

All of the respective Products (A), (B) and (C), specific examples of which are Products 1A–6A, 1B–4B and 1C–71C may be combined with starch or dextrin or mixtures of starch and dextrin. Of these we prefer those in which Products (C) respectively are employed because we have discovered that they have greater binding power in general and especially wet strength after curing. A general method for making said compositions (D) involves merely mixing together in water: starch, dextrin or mixtures of starch and dextrin and respective Products (A), (B) and (C) and preferably Products (C). The ratio of components is preferably 100 parts of starch, dextrin or mixture of starch and dextrin to about 1–30 parts of (A), (B) and (C) respectively. The amount of water may vary depending upon the concentration and consistency desired.

Example 1D 100 lbs. of corn starch and 700 lbs. of water were charged into a tank and while being constantly stirred, the mix was heated to about 150–180° F. and maintained in that temperature range for about one-half hour. Then into said mass, at room temperature, was added about 8 pounds of an 80% aqueous solution of Product 1A and the mix was stirred about 5–10 minutes to uniformity to provide Product 1D.

Example 2D 100 lbs. of unmodified starch was cooked in about 1500 lbs. of water together with sufficient NaOH to provide a mix having a pH of about 8 at about 100–160° F. for 40 minutes while being constantly stirred. Then to said mass at room temperature were added 600 lbs. of unmodified, uncooked starch suspended in about 1200 lbs. of water and also 50 lbs. of Product 1A and the resultant mass was mixed to uniformity to provide Product 2D.

Example 3D 100 lbs. of white dextrin, 200 lbs. of water and 12 lbs. of Product 1A were cooked together at 80° F. for 20 minutes to provide Product 3D.

Example 4D 300 lbs. of a blend consisting of 240 lbs. of starch and 60 parts of dextrin were mixed with 1000 lbs. of water and 20 parts of Product 1A and this mix was cooked together at 90° F. for 30 minutes to provide Product 4D.

Example 5D

Into a mixing chamber were charged starch together with water and a solution of caustic soda which were heated to provide a gelatinized starch and then in a separate chamber water and starch, together with borax and any one of said Products (A) and preferably Products (B) and (C) respectively were mixed together. 1 to 10 parts of the gelatinized starch made in the first mixture was then combined with 10–1 parts of the ungelatinized parts of the second mixture with the viscosity of such mixes and the pH thereof adjusted by the use of water and sodium hydroxide, for example, to provide a large variety of Products (D).

Example 6D

Into a primary mixing chamber were charged 678 pounds of water and 75 lbs. of corn starch which were mixed together while being heated to a temperature of 110° F. Then there was added thereto a caustic soda solution consisting of 14 lbs. of caustic soda (76%) dissolved in 41 lbs. of water. While being constantly stirred, this mix was subjected to steam to raise its temperature to 160° F. which was held while mixing for about 10 or 15 minutes and in the course of this mixing, 43 lbs. of water from the steam condensed and became added thereto.

Into a second mixing chamber were charged 1765 lbs. of water, 525 lbs. of starch, 15 lbs. of borax and 40 lbs. of the respective Products 1A–6A, 1B–4B and 1C–71C. The entire mass in the mixture was mixed to uniformity. Then over approximately a 10 or 15 minute period, the mix in said second chamber is slowly charged into the mix in the primary chamber while the same was constantly stirred to uniformity to provide Product 6D. Instead of employing 40 lbs. of said particular Products (A), (B) or (C) respectively, more or less of such products may be used depending upon the speed of cure and other characteristics which may be desired. It is recommended that the Products (B) and (C) be employed instead of Product (A) because of their unexpectedly and unusually high bonding strength and especially wet strength when used in such combination.

Examples 7D–86D

Using the same procedure and components as those described in Examples 1D–4D except that for Product 1A there is used a like amount of Products 2A–6A respectively or preferably like amounts of Products 1B–4B and 1C–71C respectively, there are provided Products 7D–86D respectively.

GENERAL EXAMPLE E

All of the respective Products (A) and (B), specific examples of which are Products 1A–6A and 1B–4B may be combined with starch or dextrin or mixtures of starch and dextrin together with urea and melamine or mixtures of urea and melamine, to provide compositions which when cured to the solid state act as excellent binders with a very high wet strength characteristic. The ratio of components is preferably 100 parts of starch, dextrin or mixtures of starch and dextrin to about 1–30 parts of (A) and (B) respectively and the amount of urea, melamine or mixtures of urea and melamine is 1–20 parts for each 100 parts of Product (A) or (B) employed.

In general, such Products (E) may be produced by mixing together in water, Products (A) and (B) respectively with starch, dextrin or mixtures of starch and dextrine. Then urea, melamine or mixture of urea and melamine is added thereto.

Example 1E 100 lbs. of unmodified starch in 1500 lbs. of water and sufficient NaOH to provide a mix having a pH of 8 is cooked at a temperature of approximately 150° F. for about ½ hour. Then 600 lbs. of unmodified, uncooked starch suspended in 1300 lbs. of water are added thereto. While being constantly stirred, to said mixture at room temperature are added 70 lbs. of Product 1A and 4.5 lbs. of urea to produce a product known hereinafter as Product 1E.

Example 2E

Employing the same procedure and components as set forth in Example 1E except that 7 lbs. of melamine is employed in place of the urea, there is produced a product known hereinafter as Product 2E.

Example 3E

Employing the same procedure and components as those set forth in Example 1E except that for the urea there is substituted a 7-lb. blend consisting of 3 lbs. of urea and 4 lbs. of melamine there is provided Product 3E.

Example 4E 100 lbs. of dextrin in 200 lbs. of water and 8 lbs. of Product 1A in 2 lbs. of water were heated together at approximately 80° F. for ½ hour. Then while at room temperature, there was added thereto 3 lbs. of melamine which was mixed therewith for uniformity to provide Product 4E.

Example 5E 300 lbs. of starch-dextrin blend consisting of 240 lbs. of starch and 60 lbs. of dextrin, 900 lbs. of water and 24 lbs. of Product 1A in 6 parts of water were heated and maintained at about 90° F. for about ½ hour. Then the source of heat is removed and when cooled to room temperature there is added thereto 2 lbs. of urea to provide Product 5E.

Example 6E

Employing the same procedures and components as set forth in Example 5 except that a mixture consisting of 1 part of urea and 6 parts of melamine are employed in place of the 2 parts of urea, there is provided Product 6E.

Examples 7E–61E

Employing the same procedure and components as those set forth in Examples 1E–6E except that Products 2A–6A, 1B–4B are respectively substituted for Product 1A, there are provided Products 7E–61E respectively.

According to the present invention, said Products (A)–(E) respectively, examples of which are Products 1A–6A, 1B–4B, 1C–71C, 1D–86D and 1E–61E and especially those of the (C), (D) and (E) series may be employed as lubricants, sizings, coating and binders for glass fibers, threads, yarns and matted and woven glass fibers, threads and yarns.

In one of its more specific aspects glass matting of the type which is to be used for heat insulation may be sprayed with Products (A)–(E) respectively in an aqueous medium to coat the individual glass fibers and at the places of crossing of the individual fibers. Then after being sprayed, the matte, whose interstices are still open, may be maintained at elevated temperatures whereby the water is driven off and the remaining organic composition is converted to the solid state. Instead of spraying, the glass matte may be dip-coated in an aqueous solution of said Products (A)–(E) respectively. In either case, whether spraying or dip-coating is employed, it is preferable that the original coating medium consist of 2–25 parts by weight of Products (A)–(E) respectively in 100 parts by weight of water and that said original coating medium be substantially uniform throughout, with such Products (A)–(E) respectively being either in solution with said water or as a dispersion or emulsion.

In another of its specific aspects the individual glass fibers which are to form the glass matte are coated by such solution or dispersions or emulsions of Products (A)–(E) and water in the course of travel of the individual glass fibers onto the support in the formation of the matte or after they reach the support and in the course of matte build-up.

In still another of its specific aspects, the individual glass fibers before being twisted together to form yarns or threads may be coated with such solution or dispersions or emulsions of Product (A)–(E) respectively and then are twisted together and the yarn or thread so produced is passed through an oven at elevated temperature to remove water and convert the coat to the solid state.

In still another aspect, the glass yarns or threads may be coated with such solutions, dispersions or emulsions of Product (A)–(E) respectively and subsequently heated to drive the water from the coat and cure the coat. Such coated glass yarns or threads may then be woven to provide glass fabrics.

In still another aspect, woven glass fabrics may be sprayed with or dipped into such solutions, dispersions or emulsions of Products (A)–(E) respectively to coat an/or impregnate same and then the so-coated glass fabric may be heated to drive off the water and cure the coat.

The following examples are given by way of illustration and not limitation of some of the methods which may be employed to produce some of the novel products of this invention.

Example 1M

A glass matting is dipped into a tank containing Product 1A and water in the proportion of 10 parts by weight of Product 1A to 90 parts by weight of water. Then the glass matting is removed therefrom and allowed to drain for 12 hours and is subsequently maintained in an oven at 350–500° F. for 30–5 minutes whereupon the water is evaporated off and the remaining organic coating is cured to the solid state. At the end of that period, the glass matting is removed from the oven and the individual glass fibers will be found to have a very thin cured coat on the surface thereof, also between the fibers at those parts which cross and also around the fibers where they cross each other, to lock them into position with respect to each other.

Examples 2M–81M

Employing the same procedure as that set forth in Example 1M but instead of 10 parts of Product 1A there is employed a corresponding amount of Products 2A–6A, 1B–4B and 1C–71C respectively to provide glass matting whose fibers are locked together by cured Products 2A–6A, 1B–4B and 1C–71C respectively.

Example 82M

To 100 lbs. of Product 1D was added 1600 lbs. of water and the mass was stirred to uniformity by the use of a high speed mixer; then a glass matting was dipped therein, removed therefrom and permitted to drain for 15 minutes and subsequently maintained for 30 minutes in an oven at 350° F. to drive off the water and cure the oragnic composition. At the end of that period the individual fibers of the glass matting will have been found to have a thin cured coating thereon and also between the fibers at the areas thereof where they cross each other and also around the fibers where they cross each other to lock the fibers into position with respect to each other at such areas.

Example 83M

The same procedure as that set forth in Example 82M is employed except that respective Products 2D–86D and 1E–61E are substituted for Product 1D to obtain a cured coated glass matting.

Substantially the same result may be obtained by following the procedure set forth in Example 82M and using the same coating compounds recited in Examples 82M and 83M, except that instead of dipping the glass matte into the mix, the mix may be applied to the fibers by spraying.

Example 1Y

A yarn consisting of about 150 individual glass filaments is passed through a mixture of 10 parts of Product 1A in 90 parts of water and then is passed through an oven at 450° F. for 1 minute whereby the water is driven off and Product 1A is converted to the solid cured state. At the end of that period, as it leaves the oven, the yarn will be found to have a cured thin coat and/or impregnant of Product 1A thereon which serves to lock the individual filaments together and serves as a lubricant in weaving and protector for the yarn.

Examples 2Y–81Y

Employing the same procedure as that set forth in Example 1Y except that instead of 10 lbs. of Product 1A a corresponding amount of Products 2A–6A, 1B–4B and 1C–71C respectively are employed, there is provided a glass yarn coated and/or impregnated with a cured thin film of Products 2A–6A, 1B–4B and 1C–68C respectively.

Example 82Y

To 100 lbs. of Product 1D was added 1600 parts of water and the mass was stirred to uniformity by the use of a high speed stirrer. Then a glass yarn consisting of 408 individual glass fibers was passed therethrough and then passed through an oven at 350° F. for 30 minutes to drive off the water and cure the organic composition. At the end of that period the yarn as it leaves the oven will be found to have a thin coating and/or impregnant of said organic composition thereon which serves to lock the individual fibers together and as a lubricant in subsequent weaving operation and protector for the yarn.

Example 83Y

Employing the same procedure and components as set forth in Example 82Y except that a like amount of Products 2D–86D and 1E–61E respectively were substituted for Product 1D there is produced a coated and/or impregnated yarn.

Example 1X

The individual short lengths of glass fibers are deposited on to a support and in the course of their travel to said support are spray-coated with respective aqueous organic composition media described in Examples 1M–83M respectively. After a 3-inch total build up of said coated glass fibers, the mass is allowed to drain at room temperature for 15 minutes and then is maintained at 350° F. for 30 minutes whereupon the water is driven off and the organic composition on the fibers is cured to the solid state and acts as a coating and binder therefor.

Example 1T

The individual glass filaments extruded from a bushing and after cooling to about room temperature pass through or are sprayed with respective aqueous composition media described in Example 1M–83M and then are twisted together to form a yarn or thread or are laid side by side flatwise and maintained at 350° F. for 30 minutes to drive off the water and cure the organic composition to the solid state. The cured organic composition coats and locks the fibers together.

Example 1F

Employing the same respective procedure and components as set forth in Examples 1M–83M except that instead of a matted glass there is employed a woven thread or yarn fabric having a thread or yarn count of 60 x 58 per sq. in. with each yarn or thread containing glass filaments of a 150 count, and instead of draining after immersion in the aqueous medium, the original coated woven fabric is passed throught squeeze rolls and then into the oven to drive off the water and cure the organic composition which may serve as a prime coat, to lock together the individual filaments of the individual yarns to prevent fraying, to lock the individual yarns to each other and/or as a lubricant.

In all of the foregoing examples of this invention, to the respective original aqueous coating media there may be added an alkaline agent such as sodium hydroxide, potassium hydroxide, lime and/or borax or an amine such as diethylene triamine, triethylamine, diethylamino propyl amine, etc. to speed the time of curing and/or to lower the temperature required for curing. By employing sufficient alkaline agent the curing may be conducted at temperatures considerably below 300° F. and at higher speeds.

Also, if desired, the respective aqueous coating media may be admitted to one inlet of an air spray gun and into the other inlet is admitted an aqueous solution of one of said alkaline materials to the extent desired to provide a coating of the desired pH which may be 8–14 and preferably at least 12. The mass may be sprayed onto the object to be coated and when the pH is 12 or above the curing may be effected at room temperature.

The Products (C), (D) and (E) illustrated by the respective Products 1C–71C, 1D–86D and 1E–61E may be mixed with hydraulic cement and water, such as Portland cement, gypsum and the like and permitted to set to provide a wide variety of useful products; they may be employed in aqueous solution as a spray coat or brush coat for Plaster or Paris or gypsum board to act as a sealant and primer; they may be mixed with hydraulic cement and water to provide a slurry which may be used in all the ways described in copending application Serial No. 350,982, filed April 24, 1953, and subsequently abandoned, and U.S. Patent No. 2,683,104 of July 6, 1954.

Having thus described the invention what is claimed is:

1. Glass fibers coated with an organic composition comprising (I) a material selected from the group consisting of (a) water soluble thermosetting resinous acetone-formaldehyde organic reaction products; (b) water soluble thermosetting resinous reaction products produced by reacting formaldehyde with acetone and another ketone having three hydrogen atoms on an alpha carbon; (c) reaction products (a) and (b) respectively, with urea, melamine and mixtures of urea and melamine respectively; and (d) combinations of starch, dextrin and mixtures of starch and dextrin respectively with (a)–(c) respectively, said (I) being cured to the substantially solid state.

2. A glass matte, some of the individual fibers thereof being bonded together with a composition comprising an organic composition comprising (I) a material selected from the group consisting of (a) water soluble thermosetting resinous acetone-formaldehyde organic reaction products; (b) water soluble thermosetting resinous reaction products produced by reacting formaldehyde with acetone and another ketone having three hydrogen atoms on an alpha carbon; (c) reaction products (a) and (b) respectively, with urea, melamine, mixtures of urea and melamine respectively; and (d) combinations of starch, dextrin and mixtures of starch and dextrin respectively with (a)–(c) respectively, said (I) being cured to the substantially solid state.

3. A glass yarn coated with an organic composition comprising (I) a material selected from the group consisting of (a) water soluble thermosetting resinous acetone-formaldehyde organic reaction products; (b) water soluble thermosetting resinous reaction products produced by reacting formaldehyde with acetone and another ketone having three hydrogen atoms on an alpha carbon; (c) reaction products (a) and (b) respectively, with urea, melamine, mixtures of urea and melamine respectively; and (d) combinations of starch, dextrin and mixtures of starch and dextrin respectively with (a)–(c) respectively, said (I) being cured to the substantially solid state.

4. A woven glass fabric some of the individual yarns of said fabric coated with an organic composition comprising (I) a material selected from the group consisting of (a) water soluble thermosetting resinous acetone-formaldehyde organic reaction products; (b) water soluble thermosetting resinous reaction products produced by reacting formaldehyde with acetone and another ketone having three hydrogen atoms on an alpha carbon; (c) reaction products (a) and (b) respectively, with urea, melamine, mixtures of urea and melamine respectively; and (d) combinations of starch, dextrin and mixtures of starch and dextrin respectively with (a)–(c) respectively, said (I) being cured to the substantially solid state.

5. The method comprising coating a glass fiber with an aqueous medium containing (I) a material selected from the group consisting of (a) water soluble thermosetting resinous acetone-formaldehyde organic reaction products; (b) water soluble thermosetting resinous reaction products produced by reacting formaldehyde with acetone and another ketone having three hydrogen atoms on an alpha carbon; (c) reaction products (a) and (b) respectively, with urea, melamine, mixtures of urea and melamine, respectively; and (d) combinations of starch, dextrin and mixtures of starch and dextrin respectively with (a)–(c) respectively, and curing said (I) to the substantially solid state.

6. The method comprising coating the individual fibers of a glass matte with an aqueous medium containing (I) material selected from the group consisting of (a) water soluble thermosetting resinous acetone-formaldehyde organic reaction products; (b) water soluble thermosetting resinous reaction products produced by reacting formaldehyde with acetone and another ketone having three hydrogen atoms on an alpha carbon; (c) reaction products (a) and (b) respectively, with urea, melamine, mixtures of urea and melamine respectively; and (d) combinations of starch, dextrin and mixtures of starch and dextrin respectively with (a)–(c) respectively, and curing said (I) to the substantially solid state.

7. The method comprising coating glass yarn with an aqueous medium containing (I) a material selected from the group consisting of (a) water soluble thermosetting resinous acetone-formaldehyde organic reaction products; (b) water soluble thermosetting resinous reaction products produced by reacting formaldehyde with acetone and another ketone having three hydrogen atoms on an alpha carbon; (c) reaction products (a) and (b) respectively, with urea, melamine, mixtures of urea and melamine respectively; and (d) combinations of starch dextrin and mixtures of starch and dextrin respectively with (a)–(c) respectively, and curing said (I) to the substantially solid state.

References Cited in the file of this patent

UNITED STATES PATENTS

| | | |
|---|---|---|
| 2,389,682 | Nebel | Nov. 27, 1945 |
| 2,629,703 | Vogelsang | Feb. 24, 1953 |
| 2,683,104 | Harvey et al. | July 6, 1954 |
| 2,711,971 | Miller et al. | June 28, 1955 |